United States Patent Office 2,898,265
Patented Aug. 4, 1959

2,898,265
METHOD OF COMBATING PESTS

Richard Wegler, Leverkusen, and Günther Unterstenhöfer, Opladen, Germany, assignors to Farbenfabriken Bayer Aktiengesellschaft, Leverkusen, Germany, a corporation of Germany No Drawing. Application April 14, 1958
Serial No. 728,030

Claims priority, application Germany April 17, 1957

6 Claims. (Cl. 167—30)

The present invention relates to and has as its objects pest control agents and a method of combating pests especially insects. The compounds which are the active ingredients of the inventive pesticides or which may be used for combating the pests may be represented by the following formula $$\text{Aryl}-\underset{\underset{R}{|}}{N}-N=S=O$$

wherein the aryl radical may belong to the benzene or naphthalene series or heterocyclic series and may be substituted, and R stands for hydrogen, lower alkyl or phenyl.

Some insect pests show an increasing resistance towards a prolonged application of insecticides. The resistance can progress to such an extent that some of the pests are no longer susceptible to an insecticide and, since its natural biological enemies are further destroyed, they may propagate unchecked. In this connection the red spider may be regarded as a plant pest which has to be taken more and more seriously. It is this insect which, according to up-to-date knowledge, shows after a comparatively short period of time, in general a few years, a strong resistance against all insecticides. A great part of active compounds found especially effective against spider mites shows already now an increasing loss in its activity.

In the following formula $$\text{Aryl}-\underset{\underset{R}{|}}{N}-N=S=O$$

more specifically the aryl radical may be phenyl, tolyl, o-, m- or p-tolyl, the various xylyls, o-, m-, or p-chlorophenyl, o-, m- or p-bromophenyl, o-, m- or p-nitrophenyl, the various chlorotolyls and nitrotolyls, o-, m- or p-carboxy- or -carbalkoxyphenyls, o-, m- or p-methoxyphenyl, and the like, amino, especially lower dialkyl amino, substituted phenyls, which further may be substituted as shown before, furthermore aryl may be α- or β-naphthyl, nitronaphthyl, lower alkyl substituted naphthyl, and naphthyl radicals which are substituted as shown before in the phenyl series, aryl may also stand for aromatic heterocyclic radicals, such as the various pyridyls, quinolyls, and such compounds substituted as shown before, also heterocyclic aryls of the benzothiophane, benzothiazolyl series, and the like may well be used in accordance with the present invention.

Compounds of this inventive type with a remarkable low phytotoxicity are obtainable in known manner, for example by the reaction of thionylaniline with phenyl hydrazine in a weakly acid solution, the thionyl radical migrating from the aniline to the phenyl hydrazine, as shown by the following equation.

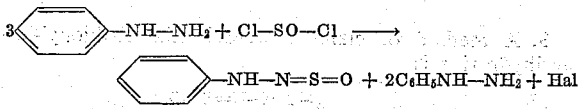

(Berichte, vol. 22, page 2228; vol. 23, 475; vol. 24, pages 751, 145.)

The compounds if not new are obtained in strictly the same way as described in the aforegoing literature.

The compounds are generally obtained in an excellent yield of highest purity in a crystalline form and are stable in water in contrast to the thionylaryl amines.

A great variety of thionylaryl hydrazines are useful as acaricides. The phenyl radicals may thus be mono- or poly-substituted, for example, by halogen or alkyl radicals or other groups. All compounds of this type exhibit a varying but always strong acaricidal action.

The compounds described above are applied in the same manner as known pest control agents, i.e. in combination with suitable solid or liquid diluents or extenders. Such solid extenders are, for example, lime, chalk, talcum, bentonite, kieselguhr, clay and the like. As liquid extender water has to be considered in the first instance, if desired in combination with an emulsifier, especially with emulsifiers of the type of polyglycol ethers such as e.g. phenyl hydroxy polyglycol ether, diphenyl hydroxy polyglycol ether or especially a benzyl hydroxy polyglycol ether up to about 15 glycol radicals. Also other organic solvents, alcohols or ketones are often very suitable for this purpose. The following examples show the insecticidal action of the compounds according to the invention; they are given for the purpose of illustrating the invention.

Example 1

Dwarf beans (*Phaseolus vulgaris*) strongly infected by a highly resistant strain of the common spider mite (*Tetranychus telarius*) are sprayed with aqueous spraying solutions prepared from the active substance

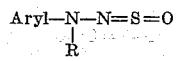

with the use of the same amount of acetone as redissolving agent and 50% of a commercial emulsifier (benzylhydroxy diphenyl polyglycol ether). In different intervals the mortality of the post-embryonic active stages and eggs is established. The results are given in the following table, the concentrations being related to the active substance.

|  | Percent Dead active stages | | Degree of infection, 8 days | Ovicidal action, 12 days |
|---|---|---|---|---|
|  | 24 h. | 48 h. | | |
| 0.2% | 100 | 100 | | |
| 0.1% | 100 | 100 | 0 | 100 |
| 0.05% | 100 | 100 | 0 | 100 |
| 0.025% | 100 | 100 | 0 | 50 |
| Untreated control plants | 0 | 0 | 5 | 0 |

The compounds show a strong acaricidal and ovicidal action, leading in concentrations up to 0.025% to complete freedom from infection of the plants.

Example 2

According to the same process the compound of the following formula

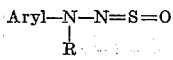

shows the following values:

| Ho 30 | Percent Dead active stages | | Degree of infection, 8 days | Ovicidal action, 12 days |
|---|---|---|---|---|
| | 24 h. | 48 h. | | |
| 0.2% | 100 | | | |
| 0.1% | 100 | 100 | | 100 |
| 0.05% | 100 | 100 | 0 | 100 |
| 0.025% | 90 | 95 | 2 | 30 |
| Untreated control plants | 0 | 0 | 5 | 0 |

Example 3

The compound of the following formula

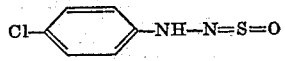

shows the following values:

| Ho 26 | Percent Dead active stages | | Degree of infection, 8 days | Ovicidal action, 12 days |
|---|---|---|---|---|
| | 24 h. | 48 h. | | |
| 0.2% | 100 | | | |
| 0.1% | 100 | 100 | | |
| 0.05% | 100 | 100 | 0 | 100 |
| Untreated control plants | 0 | 0 | 5 | 0 |

Example 4

The compounds of the following formula

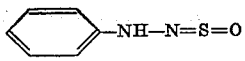

show the following values according to the test described in Example 1:

| Ho.18 | Percent Dead active stages | | Degree of infection, 8 days | Ovicidal action, 12 days |
|---|---|---|---|---|
| | 24 h. | 48 h. | | |
| 0.2% | 100 | 100 | 0 | 100 |
| 0.1% | 90 | 100 | 0 | 50 |
| 0.05% | 90 | 90 | 2 | 0 |
| 0.025% | 60 | 60 | 3 | 0 |
| Untreated control plants | 0 | 0 | 5 | 0 |

Example 5

According to the same process, the compound of the following formula

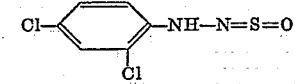

shows the following values:

| Ho 27 | Percent Dead active stages | | Degree of infection, 8 days | Ovicidal action, 12 days |
|---|---|---|---|---|
| | 24 h. | 48 h. | | |
| 0.2% | 100 | 100 | 0 | 100 |
| 0.1% | 95 | 100 | 1 | 90 |
| 0.05% | 30 | 30 | 1 | 90 |
| 0.025% | 10 | 15 | 3 | 0 |
| Untreated control plants | 0 | 0 | 5 | 0 |

By the same way as described in example 1 there are tested the following compounds, the results are given in the table below:

| Compound | concentration, percent | percent dead active stages after 48 hours | degree of infection, 8 days |
|---|---|---|---|
| $C_2H_5O-CO-\langle\rangle-NH-N=S=O$ | 0.2 | | 3 |
| $O_2N-\langle\rangle(NO_2)-NH-N=S=O$ | 0.2 | | 3 |
| benzothiazolyl-C-NH-N=S=O | 0.2 | 20 | 4 |
| benzimidazolyl-C-NH-N=S=O | 0.2 | 20 | 4 |
| $CH_3-\langle\rangle-NH-N=S=O$ | 0.2 | 100 | 1 |
| $O_2N-\langle\rangle(NO_2)(N(CH_3)_2)-NH-N=S=O$ | 0.2 | 90 | 2 |
| naphthyl-NH-N=S=O | 0.2 / 0.02 | 100 / 100 | 1⁰ |
| $CH_3O-\langle\rangle-NH-N=S=O$ | 0.2 / 0.02 | 100 / 100 | 1⁰ |
| $Cl-\langle\rangle(CH_3)-NH-N=S=O$ | 0.2 / 0.02 | 100 / 40 | 1 |
| $\langle\rangle-N(CH_3)-N=S=O$ | 0.2 | 100 | 2 |
| $\langle\rangle-N(C_6H_5)-N=S=O$ | 0.2 | 90 | 3 |

¹ Ovicidal activity.

We claim:

1. A method of combating insects which comprises applying to the insect an effective amount of an N-thionyl-N'-arylhydrazine of the general formula $$\text{Aryl}-\underset{R}{N}-N=S=O$$

wherein the aryl radical is a member selected from the group consisting of a phenyl radical, a naphthyl radical, phenylthiazolyl radical and phenyl-imidazolyl radical, and R stands for a member selected from the group consisting of hydrogen, lower alkyl and phenyl.

2. The method of claim 1 wherein the N-thionyl-N'-arylhydrazine is

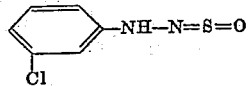

3. A method of claim 1 wherein the N-thionyl-N'-arylhydrazine is

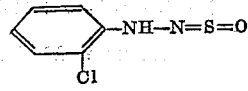

4. A method of claim 1 wherein the N-thionyl-N'-arylhydrazine is
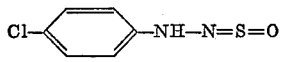
5. A method of claim 1 wherein the N-thionyl-N'-arylhydrazine is
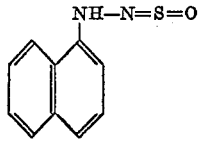
6. A method of claim 1 wherein the N-thionyl-N'-arylhydrazine is
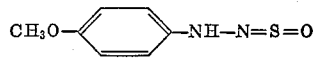
No references cited.